United States Patent [19]

Grussen

[11] 4,090,631
[45] May 23, 1978

[54] SCREW-TYPE BOTTLE CAP HAVING IMPROVED SEALING PROPERTIES

[76] Inventor: Jean Grussen, "La Noue" Mondreville, 78114 Longnes, France

[21] Appl. No.: 764,069

[22] Filed: Jan. 31, 1977

[30] Foreign Application Priority Data

Feb. 3, 1976 France .................................. 76 02959
Nov. 29, 1976 France .................................. 76 35968

[51] Int. Cl.² ............................................ B65D 41/04
[52] U.S. Cl. .................................. 215/329; 215/341; 215/344; 215/DIG. 1
[58] Field of Search ................. 215/341, 344, DIG. 1, 215/270, 329

[56] References Cited

U.S. PATENT DOCUMENTS

| | | | |
|---|---|---|---|
| 3,038,624 | 6/1962 | Wieckmann | 215/DIG. 1 |
| 3,074,579 | 1/1963 | Miller | 215/DIG. 1 |
| 3,380,610 | 4/1968 | Krieps | 215/355 X |
| 3,780,897 | 12/1973 | Wassilieff | 215/DIG. 1 |

FOREIGN PATENT DOCUMENTS

| | | |
|---|---|---|
| 2,187,625 | 1/1974 | France. |
| 1,486,721 | 5/1967 | France. |
| 1,485,328 | 5/1967 | France. |
| 2,340,647 | 2/1975 | Germany. |
| 920,937 | 3/1963 | United Kingdom. |

Primary Examiner—Donald F. Norton
Attorney, Agent, or Firm—Brisebois & Kruger

[57] ABSTRACT

A screw-type bottle cap molded in one piece from plastic material comprises an internal sealing skirt depending from the top of said cap and adapted to be force-fitted into the externally threaded neck of a bottle, a first sealing lip concentric with said skirt and positioned to engage the upper end of the neck of said bottle when said cap has been screwed home, and a second sealing lip adapted to cooperate with the upper outer surface of said bottle neck. The sealing skirt comprises a short upper portion having a slight outward conicity when unstressed, and the external diameter of which, at its connection to the top of said cap, is greater than the maximum internal diameter of said neck, allowing for manufacturing tolerances. Said upper portion merges into a central portion having an inward conicity, and terminating in a substantially radial collar, the periphery of which is adapted to bend upwardly as the cap is screwed down to form an additional seal with the inner surface of said bottle neck.

8 Claims, 5 Drawing Figures

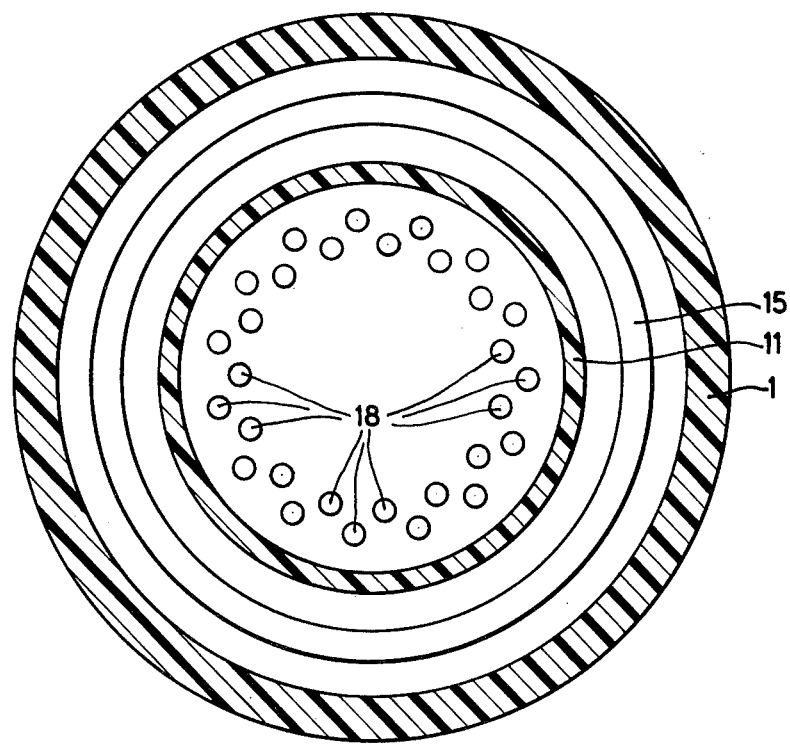
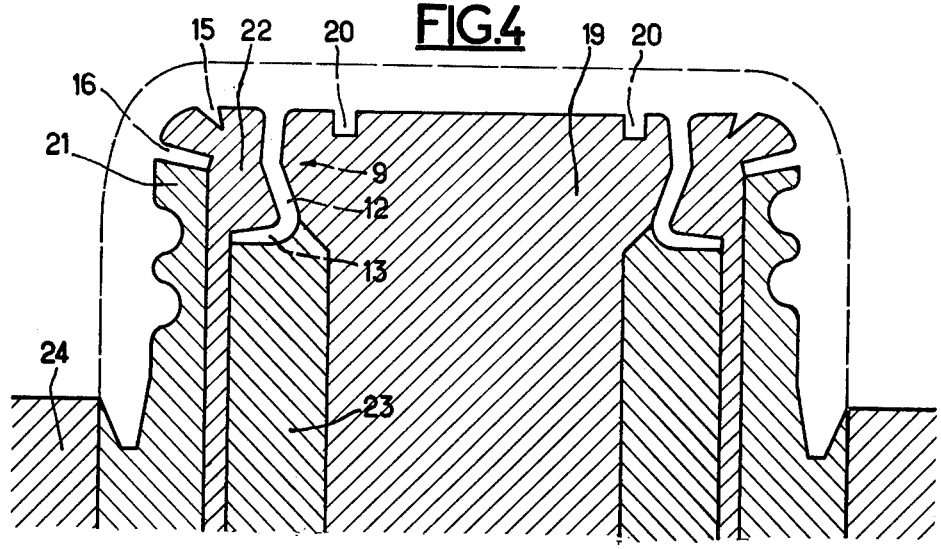

SCREW-TYPE BOTTLE CAP HAVING IMPROVED SEALING PROPERTIES

BACKGROUND OF THE INVENTION

This invention relates to a bottle cap having internal threads and adapted to seal the neck of the bottle or jar. The invention is particularly adapted to closing bottles containing gasified liquids.

There are known screw-type bottle caps, usually made of metal, such as aluminum, in which the internal screw thread is formed on the bottle cap by the neck of the bottle at the moment at which the cap is applied, by rotating the cap, which is driven about the neck of the bottle by means of a grooved swaging roller. In these caps sealing is assured by a seal of plastic material, or some other sealing material serving the same purpose, attached to or poured into the top of the cap.

This type of cap has many disadvantages, principally because of the substantial tolerances in diameter which occur in practice with respect to the necks of the bottles to be closed, especially glass bottles. Because of these substantial tolerances, the use of this type of capsule frequently leads to defects in the threads of the necks which result in leaks and, in certain cases, make it practically impossible to unscrew the cap. Moreover, the threads formed in the cap during the closing operation appear on its outside and leave little space for external serrations, so that the user frequently encounters difficulty in unscrewing this type of cap.

Caps are also known which have internal screw threads made entirely from molded plastic material. Some of these caps have an internal sealing skirt adapted to cooperate with the internal wall of the neck of the bottle or jar to be closed. These skirts, which often have a cylindrical shape, do not insure a sufficiently tight seal because of the differences in diameter which occur in the necks of bottles such as those presently being manufactured. Up to the present no one has succeeded in making a cap of this type which insures an adequate seal over a large range of tolerances in the diameter of the necks of the bottles.

Caps are also known which are made entirely of plastic molded material in which the sealing skirt is replaced by a diaphragm in the form of a bowl which covers the upper part of the neck of the bottle. The pressure at the top of this type of screw type which is all that makes it possible to obtain a suitable seal, leads, by reason of the lack of rigidity of the bowl, to considerable difficulties in unscrewing the cap. These difficulties are particularly critical in the case in which the bottle is designed to contain a gasified liquid, since the gas has a compressive effect on the bowl which increases the grip.

It is the object of the present invention to provide a bottle cap having internal threads made entirely of a plastic material molded in one piece and comprising a group of sealing means adapted to insure perfect sealing over a very large range of tolerances of the bottle neck diameter, all while permitting the cap to be easily unscrewed by the user.

It is a further object of the invention to permit a substantial increase in the speed of molding such a screw cap by substantially facilitating the unscrewing of the internal part of the mold after the operation of molding the plastic material.

The screw-type cap according to the invention is made entirely from a single piece of molded plastic material. It comprises an internal sealing skirt adapted to be force-fitted into the neck of a bottle or jar. According to the invention the internal sealing skirt has an upper part which is substantially cylindrical after it has been screwed into the neck and an external diameter which is greater than the maximum internal diameter of the neck, after allowing for the range of manufacturing tolerances in the bottles or jars to be capped.

In accordance with the invention the substantially cylindrical upper part of the sealing skirt is extended downwardly by an inwardly directed conical portion and a substantially radial collar. The dimensions of the conical portion and the collar are such that the two parts of the sealing skirt are capable, during screwing of the cap on the neck of the bottle or jar, of so deforming that the end of the collar is deformed upwardly into contact with the wall, without interfering with the upper cylindrical portion thereof which remains in sealing contact with the internal wall of the neck.

Such an arrangement is particularly advantageous in that the said end of the collar provides, after screwing down of the cap, a by no means negligible sealing effect with respect to the liquid in the bottle to be capped, but this sealing effect ceases to exist relative to gases inside the bottle after unscrewing, once the short cylindrical upper part of the sealing skirt is completely clear of the neck of said bottle.

The gas found in this bottle may then escape outwardly, before the cap is totally free of the threads on the outside of the neck, which prevents the capsule from being violently projected upwardly after complete unscrewing, as is the case when the cap has a substantially cylindrical sealing skirt with a height substantially greater than the maximum change in the axial position of the cap which may be engendered by its screwing or unscrewing.

It is equally important, in the embodiment of the cap according to the invention, that said end of the collar cannot be subjected after screwing down, to an excessive pressure toward the upper part of the bottle, which would be capable of creating a lasting seal at the level of this end of the collar, comparable to the above-mentioned use of a cylindrical sealing skirt having an excessive height and capable of causing the same abrupt projection effects on the capsule after unscrewing.

According to the invention, in order to insure perfect sealing, the cap also comprises, in combination with the sealing skirt, a first substantially axial lip positioned in the bottom of the cap and inclined slightly inwardly so as to cooperate, during screwing down of the cap, with the upper edge of the bottle, by applying itself thereto while deforming inwardly, and a second substantially radially lip projecting inwardly of the cap so that during the unscrewing of the latter, the second lip may be applied, while deforming inwardly, against the external wall of the neck.

In a preferred embodiment of the cap according to the invention the top thereof is thin and curved inwardly of the jar so as to be capable of deforming toward the outside during the screwing down of the cap on the neck.

The wall of the cap according to the invention advantageously comprises, beneath the internal threads, a smooth cylindrical portion extending toward the bottom as an outwardly tapered conical portion. The conical portion makes it possible to facilitate the introduction of the cap onto the neck at the moment of screwing while the smooth cylindrical portion makes it possible to correctly guide the cap during this operation, which may then be carried out automatically and at high speeds.

As is well known, the molding of this type of screw cap from plastic material necessitates the use of a mold having two parts between which the plastic material is injected. Because of the internal thread, it is necessary, in order to extract the cap after the molding operation, to proceed by unscrewing the cap from the inner part of the mold. During this unscrewing operation it is desirable to hold the cap in a fixed position with respect to a member of the mold. To obtain this result blocking means are generally provided which may consist of projections from the capsule cooperating with recesses in the mold, or vice-versa. These means are generally placed on the periphery of the external wall of the cap. In view of the relatively thin nature of this wall, these blocking means may consist of a single circular row of projections or perforations.

The present invention makes it possible to improve the blocking of the capsule with respect to the mold during the unscrewing operation and thus carry out this operation in an automatic manner at very high speed.

In accordance with the invention, blocking means are positioned on the internal wall of the bottom of the cap inside the sealing skirt. This internal arrangement makes it possible to provide several circular rows of blocking projections or analogous recesses.

The mold adapted to the manufacture of a cap according to the invention has an inner part comprising a stationary central core surrounded by a socket capable of rotating about said core and of being axially displaced with respect thereto in order to permit the extraction of the molded cap held in position by the blocking means fixed to the central core.

Moreover, in order to improve the sealing, the cap in question is preferably provided with internal threads projecting from its external skirt which do not stop abruptly at their lower end, with a profile similar to a quarter of a sphere connecting it to the internal surface of said external skirt having a maximum diameter and corresponding to the bottom of said threads. Instead, the section of lower part of said threads decreases much more slowly toward their lower end in a manner comparable to that of the section of the hollow threads formed in the lower part of the neck of the bottle to be capped.

It will be understood that, taking into account the plasticity of the material constituting said caps and the possibilities of local compression of this material, it is possible to obtain in this manner a very much improved seal which could not be obtained by means of threads having a constant section, in which case it is necessary to leave a sufficient play to permit sliding without excessive friction of the external surface of said internal threads inside the hollow threads formed on the external part of the necks of the bottles.

It will be noted that the sealing contact of the lower ends of the threads against the wall of the hollow threads of the necks of the bottles considerably improves the seal because the liquid which may pass between the cap and the neck of the bottle at the level of the parts having a constant section of said helical threads, is stopped above the lower end of these threads having a slowly decreasing section.

In most cases, this reduction in the section of the threads produced by grooving the neck of the bottle takes place by imparting a horizontal direction to the lower edge of this groove, so that it makes, with the lower edge of the same thread, an angle corresponding to the pitch of these helical threads.

In this case it follows that, in like manner, the lower edge of the end of the lowermost turn of the threads which are in relief and provided on the inside of said cap of plastic material also has a horizontal direction.

The invention will be better understood from the following description of several embodiments, given purely by way of illustration and example, with reference to the accompanying drawings in which:

FIG. 3 is a sectional view taken along the line III—III of FIG. 1, showing the inner surface of the top of the cap;

FIG. 4 is a schematic view showing in section the lower part of a mold permitting the manufacture of a cap according to the preceding figures.

Figure 1:
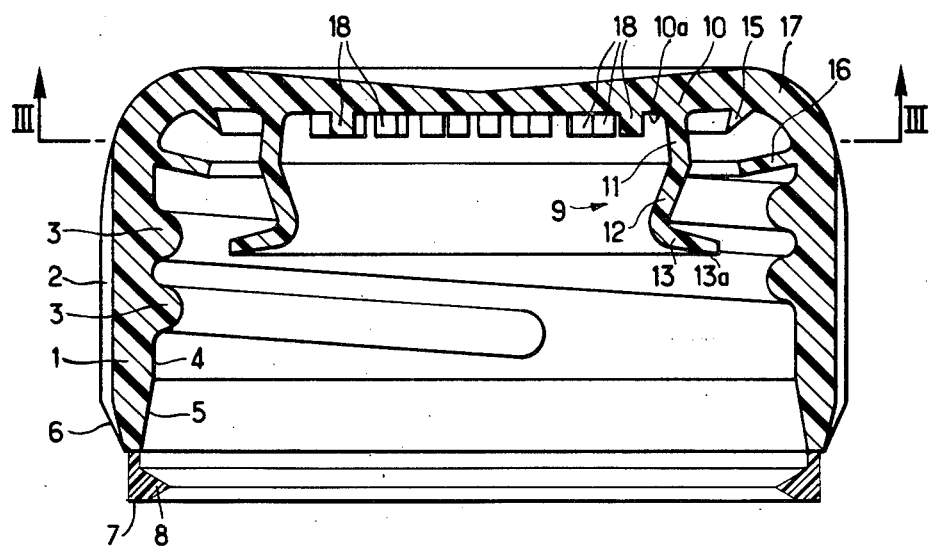
FIG. 1 shows one embodiment of a cap according to the invention, in axial section.

As is shown on the figures, the cap according to the invention is made of a single piece of molded plastic material, and comprises an external skirt 1 of generally cylindrical shape, having on its outer surface axial grooves 2 extending for the full height of the skirt, and making it possible to facilitate its manual screwing or unscrewing onto the neck of a bottle or jar by the user. The skirt 1 has internal threads 3 comprising two turns.

The inner surface of the free end of the skirt 1 has a cylindrical portion 4 beneath the threads 3, said portion 4 leading downwardly, that is to say in the direction of the free end of the skirt 1, to a conical portion 5 which slopes outwardly. In this way it is possible to automatically screw the cap on the neck of a bottle at a high speed. The conical portion 5 makes it possible to facilitate the introduction of the cap onto the neck while the cylindrical portion 4 improves the centering and guides the cap into the correct position with respect to the neck so that the threads 3 of the cap cooperate correctly with the corresponding threads on the outer skirt of the neck of the bottle.

As may be seen on the drawings, the outside of the free end of the outer skirt 1 terminates at its bottom in a champfer 6 having a generally conical shape comprising the end of the grooves 2 so as to improve the aesthetic aspect of the cap once mounted on the bottle, the extreme edge of which approaches the wall of the neck. To obtain this particular shape it will be noted that the plane of the joint during the molding of the cap is positioned, not at the free end of the skirt 1, but just above this conical portion 6.

The cap may advantageously be provided with a retaining ring 7 shown in thin lines on the drawing, which may be torn away by the user and comprises a flange 8 which cooperates with the corresponding flange on the neck of the bottle so as to insure an inviolability seal. It should be noted that this retaining ring 7, which is not indispensable, may be annular or may extend over only a portion of the periphery of the cap. As may be seen on FIG. 1, the cap per se as shown comprises a sealing skirt 9 projecting inwardly from the top 10 of the cap and adapted to cooperate with the internal wall of the neck of a bottle as may be seen on FIG. 2 so as to insure a convenient seal.

The sealing skirt 9 has an upper 11 directly attached to the top 10. The portion 11 has a substantially cylindrical shape. On FIG. 1, in which the cap is shown before being screwed on, it will nevertheless be noted that there is a slight conicity toward the inside, which conicity corresponds to the concavity of the top 10, and on FIG. 2 to the contrary, it will be noted that after screwing on the neck of a bottle, the portion 11 takes a form more nearly cylindrical and enters into straight line contact with the inner wall of the neck of the bottle. This deformation of the portion 11 improves the seal, and produces at the same time as a corresponding deformation of the top 10. The outer diameter of this cylindrical portion 11 is, according to the invention, greater than the maximum internal diameter of the neck, allowing for the possible manufacturing tolerances, for instance the tolerances in the glass works.

The upper cylindrical portion 11 extends away from the top 10, that is to say toward the bottom of FIG. 1, while the inwardly directed conical portion 12 terminates in a substantially radial collar 13 connected to the conical part by a rounded corner and decreasing in thickness towards its free end.

Figure 2:
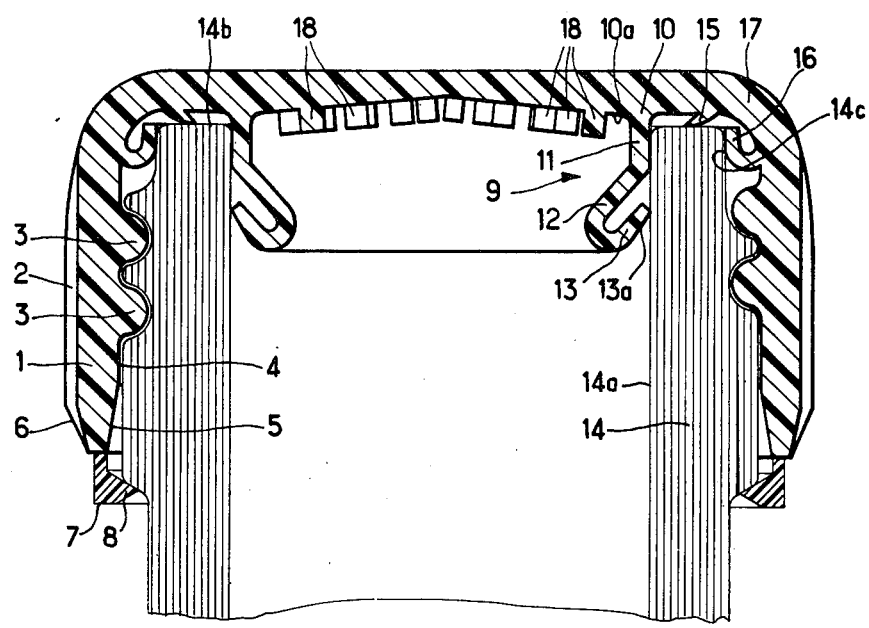
FIG. 2 shows an axial section taken through the cap of FIG. 1 after it has been screwed onto the neck of a bottle.

As may be seen on FIGS. 1 and 2, the sealing skirt has a particular shape, the relative dimensions of the collar 13 and the conical part 12 being such that, during screwing of the cap onto the neck of a bottle 14, the collar 13 deforms upwardly in the direction of the top 10 and its outer face 13a comes into contact with the cylindrical inner wall 14a of the neck. The free end of the collar 13 nevertheless remains at right angles with the conical part 12 which deforms slightly toward the inside as may be seen in FIG. 2.

Because of this particular structure it will be seen that the collar 13 does not come into contact with the inner wall 14a of the neck adjacent the cylindrical part 11 of the skirt which would have the effect of creating a substantial excess thickness at the level of the cylindrical portion of the skirt and render any unscrewing by hand practically impossible. On the contrary, by reason of the structure of the skirt, sealing is assured by the cylindrical portion 11 of the skirt, the position of which is not modified by the deformation of the collar 13. The latter considerably improves the sealing since its free end comes to bear against the internal wall 14a of the neck 14 and is pressed against the latter by the pressure of the gas which may exist inside the bottle and which is exerted on the internal surface of the conical part 12 after screwing on of the cap. However, as has already been said, once the cylindrical part 11 of the sealing skirt is completely separated from the internal wall 14a of the neck 14 it regains its slightly conical form and the seal at the level of the end of the collar 13 is substantially broken, thus permitting gas inside the bottle to escape to the outside so as to avoid projection of the cap upwardly when, after complete unscrewing, it is freed from the external threads on the bottle neck.

It should moreover be noted that, at this moment, no complementary seal is assured in practice at the level of the ends of the two ribs 15 and 16.

The cap also comprises a first substantially axial lip positioned in the top of the cap surrounding the skirt 9 and slightly inclined toward the inside, as may be seen on FIG. 1. This axial lip 15, in section, has a profile which narrows so as to facilitate removal of the cap from the mold by extraction as will be hereinafter seen.

A second substantially radial lip 16 projects inwardly of the cap from the upper part of the wall 1 near the angle 17 between the wall 1 of the cap and the top 10 thereof. As may be seen on FIG. 1, the two lips 15 and 16 are thus positioned near the said angle 17. In order to increase the rigidity of the cap in the neighborhood of these sealing lips the thickness of the wall of the cap in the vicinity of the angle 17 is increased, especially with respect to the thickness of the wall of the top 10. The wall of the top having a reduced thickness is, as may be seen on FIG. 1, slightly concave toward the interior so as to be capable of deforming toward the exterior and adopting a substantially horizontal position during the complete screwing down of the cap, as may be seen on FIG. 2.

The inner wall 10a of the top of the cap has, as may be seen on FIGS. 1 to 3, two circular rows of blocking projections 18. In order to decrease the bulk of these projections they are staggered as may be seen on FIG. 3.

FIG. 2 shows the cap screwed onto the neck 14 of the bottle. In the example illustrated the internal diameter of the neck of the bottle is a diameter which is the average of the range of manufacturing tolerances. The upper cylindrical part 11 of the sealing skirt 9 is thus slightly deformed toward the inside, which insures an excellent contact between this cylindrical part 11 and the cylindrical inner wall 14a of the neck 14. A second contact seal is provided by the end of the collar 13, which is bent upwardly and under pressure, as has been seen, due to the elasticity of the material and the possible pressure of the gas inside the bottle.

Thanks to the inward inclination of the axial lip 15, the latter deforms inwardly and comes to bear on the upper edge 14b of the neck 14. In like manner, during screwing on of the cap with respect to the bottle, the radial lip 16 deforms upwardly as may be seen in FIG. 2, coming into contact with the external cylindrical wall 14c of the neck 14.

It will thus be seen that, if the neck is normally shaped, a seal is provided at four points or regions. As a consequence of this redundance, it is possible to obtain a perfect seal regardless of the tolerances of the internal diameter of the neck and even in the case of defective upper edges or slightly different structures. In such situations, in effect, it is possible that one of the lips 15 and 16 does not produce a perfect seal, but is is only necessary that the other sealing member be sufficient to obtain the desired result.

FIG. 4 shows the inner part of a mold adapted to manufacture such a cap entirely from a molded plastic material. This inner part comprises a stationary central core 19 which may for example comprise internal cooling means not shown on the drawing. The upper surface of the stationary central core 19 has two circular rows of recesses 20 adapted to form the locking projections 18. A socket 21 encircling the central core 19 is connected to means not shown on the figure adapted to cause rotation of the socket with respect to the central core 19 at the same time as an axial displacement of the socket downwardly of FIG. 4. To permit easy removal of the cap from the mold and especially the skirt 9, the socket 21 extends only as far as the radial lip 16. A second internal socket 22 and an intermediate member 23 are interposed between the socket 21 and the central core 19. As may be seen on FIG. 4, the internal socket 22 and the socket 21 define the radial lip 16, while the external surface of the skirt 9 is defined by the internal socket 22, the intermediate socket 23 defining the other face of the lower end of the skirt 9, the internal socket 22 and the intermediate member 23 being each connected independently to means not shown on the drawing, to permit their axial independent displacement downwardly. An external ring 24 encircles the socket 21 and is connected to means (not shown) adapted to produce axial displacement of said ring away from the socket 21, that is to say toward the top of FIG. 4. The cap is removed from the mold in the following manner:

After the molding proper, the outer part of the mold (which is not shown on FIG. 4) is removed, and the cap remains attached to the inner part of the mold by its threads 13 which hold it on the socket 21. The socket 21 is then rotated at the same time that it is moved downwardly thus unscrewing the socket 21 from the cap, which is correctly maintained in a stationary position by means of locking projections 18 cooperating with the recesses 20 in the central core 19. This unscrewing operation may be carried out at high speed because of the existence of the double row of locking projections. The intermediate member 23 is then lowered which releases the lower face of the collar 13 and the internal socket 22 is then lowered. The movement of extracting the socket 22 from the cap is possible despite the projecting portions which constitute the collar 13 and the lips 15 and 16 by reason of the elasticity of the material and the particular configuration of these members. Thus it is that the latter have a thickness which decreases toward the free ends and that the junction between the collar 13 and the conical part 12 is rounded so as to favor deformation during extraction.

After this operation the cap is still held on the stationary central core 19 by the projections 18. A movement of the ring 24 toward the top so that it comes into abutment on the lower part of the cap separates the latter from the central core 19 more easily when the locking projections 18 advantageously have a suitable skin.

One thus obtains a bottle cap having internal threads and which makes it possible to insure a perfect seal regardless of the size of the bottle within very large ranges of tolerance for the necks, and in particular for the necks of glass bottles which have already been used and may have irregularities, defects, etc.

Figure 5:
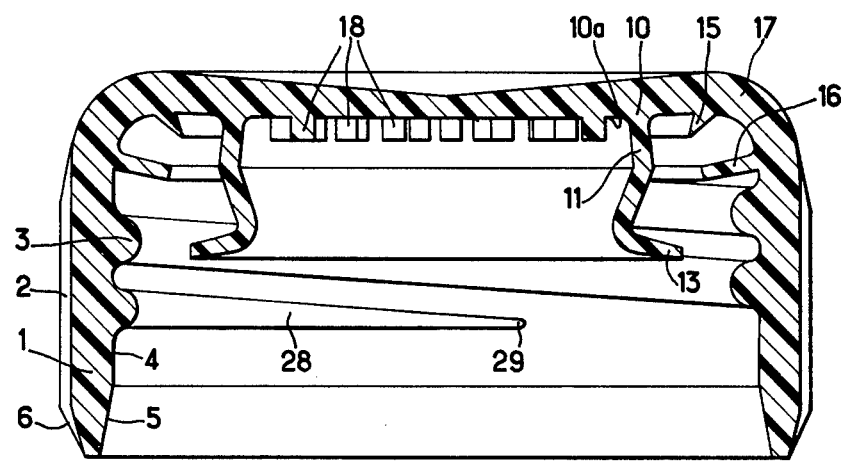
FIG. 5 is a section comparable to that of FIG. 1 but in which the frangible lower sealing member has not been shown.

If the end of the lower turn of the thread 3 which is behind the plane of the section known on FIGS. 1 and 5 is compared, it will be seen that this end has, on FIG. 1, the shape of a quarter of a sphere having a radius equal to that of the section of said threads, whereas on FIG. 5 this end is in the form of a triangle 28 having at 29 a rounded portion having a small radius of curvature adapted to facilitate the removal of the caps from the mold, the section of this end decreasing regularly and linearly up to a very low value at 29. It will be understood that after screwing on, the coincidence between the part 28 corresponding to the end of the lower turn of the threads 3 and the taper formed in the neck of the bottle may impart improved sealing properties to said cap, which cannot be obtained at the level of turns of constant section.

It follows that the manufacture by injection of such threads requires a molding apparatus for said cap which is a little more complicated than the one shown on FIG. 4 of the attached drawings, but experience has shown that by causing the lower ends of the threads provided respectively on the cap and on the neck of the bottle to cooperate in an intimate manner and over a sufficiently long angular sector in accordance with a preferred variation of the embodiment of the invention, one may obtain a considerably improved seal.

It should be noted that, as pointed out above, the lower edge of the end 28 of the lowest turn of the threads 3 may have a different inclination from that of the upper edge without this lower edge being necessarily horizontal as in the case of FIG. 5. It will of course be appreciated that the embodiments which have just been described may be modified as to detail and certain elements thereof replaced by equivalent elements without thereby departing from the basic principles of the invention.

What is claimed is:

1. In a screw-type bottle cap molded in one piece from plastic material and comprising
    an internal sealing skirt depending from the top of said cap and adapted to be force-fitted into the externally threaded neck of a bottle,
    a first sealing lip concentric with said skirt and positioned to engage the upper end of the neck of said bottle when said cap has been screwed home, and
    a second sealing lip adapted to cooperate with the upper outer surface of said bottle neck,
    the improvement according to which said sealing skirt comprises a short upper portion having a slight outward conicity when unstressed, and the external diameter of which, at its connection to the top of said cap, is greater than the maximum internal diameter of said neck, allowing for manufacturing tolerances,
    said upper portion merging into a central portion having an inward conicity, and terminating in a substantially radial collar, the periphery of which is adapted to bend upwardly as the cap is screwed down to form an additional seal with the inner surface of said bottle neck,
    and said second sealing lip is circular, circumferentially continuous, and adapted to cooperate with a smooth portion of said bottle neck above the threads thereon.

2. Cap according to claim 1 in which the top of the cap is thinner at its central part than at its periphery and has a concave external profile so that it may deform outwardly when it is screwed onto the bottle.

3. Cap according to claim 1 in which the cap has a side wall and the junction between the top and side wall of the cap is thickened to increase the rigidity of the cap near the two lips.

4. Cap as claimed in claim 1 having external serrations over its entire height to facilitate gripping and in which the lower edge of the cap is chamfered.

5. Cap as claimed in claim 1 in which the inner surface of the top of the cap has inside said skirt locking means for interfitting with a mold part to facilitate unscrewing of another mold after the molding operation by holding the first mentioned mold part in position.

6. Cap according to claim 5 in which the locking means consists of two circular rows of projections.

7. Screw-threaded cap according to claim 1 in which the cap has threads projecting from the inside of said cap and terminating at a lowest turn, said lowest turn having a section which decreases according to a substantially linear law up to a zero value over an angular sector of the order of 90°, so as to permit sealing of said section against a substantially cooperating surface at the lower end of the concave threads formed in the neck of the bottle to be capped.

8. Cap as claimed in claim 7 in which said cap has a lower edge, the lower edge of said lowest turn of said threads of decreasing section is parallel to the lower edge of said cap and said decreasing section is of part-circular shape.

* * * * *